Oct. 13, 1964 D. T. AYERS, JR 3,152,518
FLUID PRESSURE MOTOR MECHANISM
Filed March 8, 1963 3 Sheets-Sheet 1
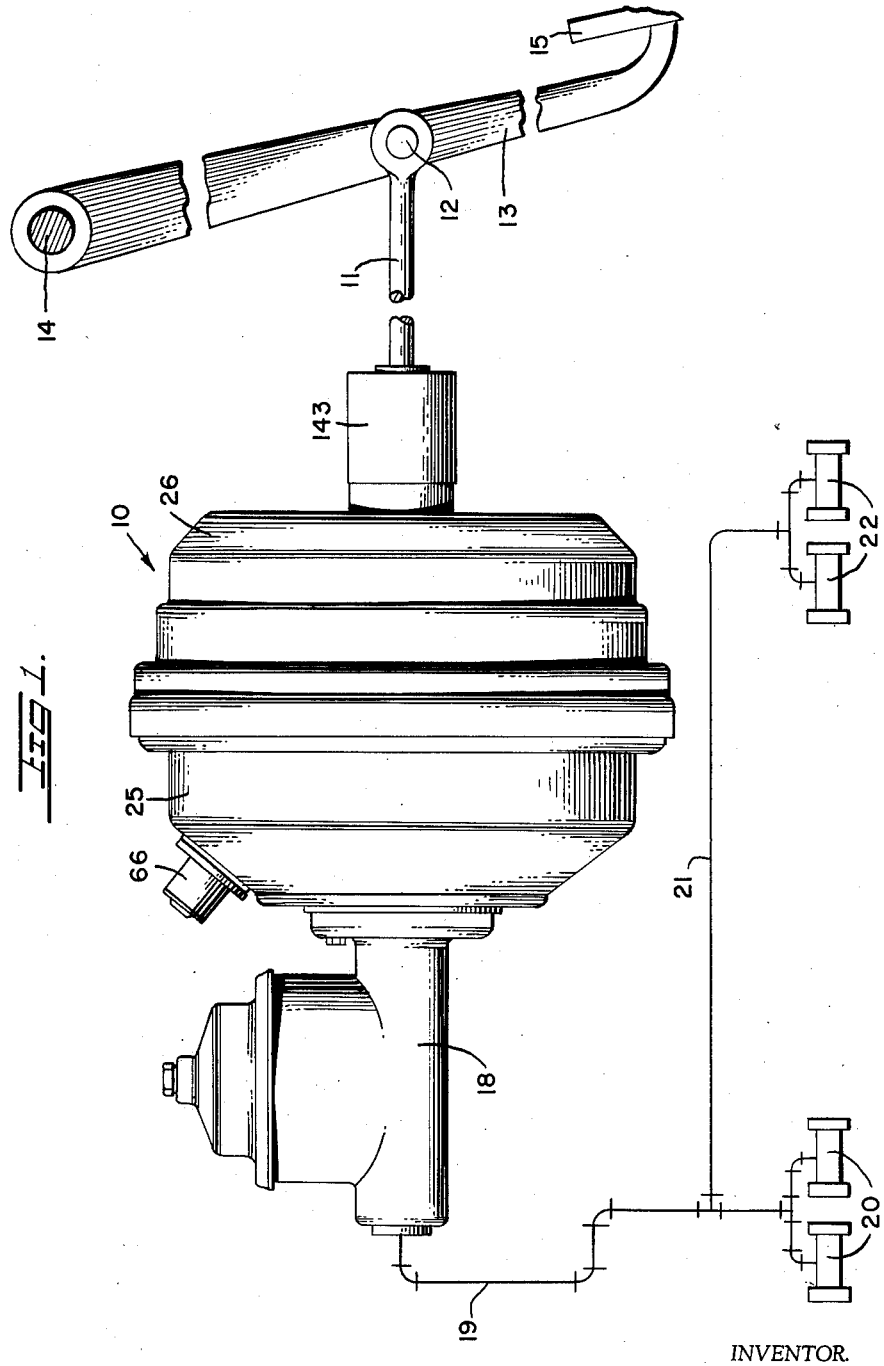
INVENTOR.
DAVID T. AYERS, JR.
BY
*John F. Phillips*
ATTORNEY

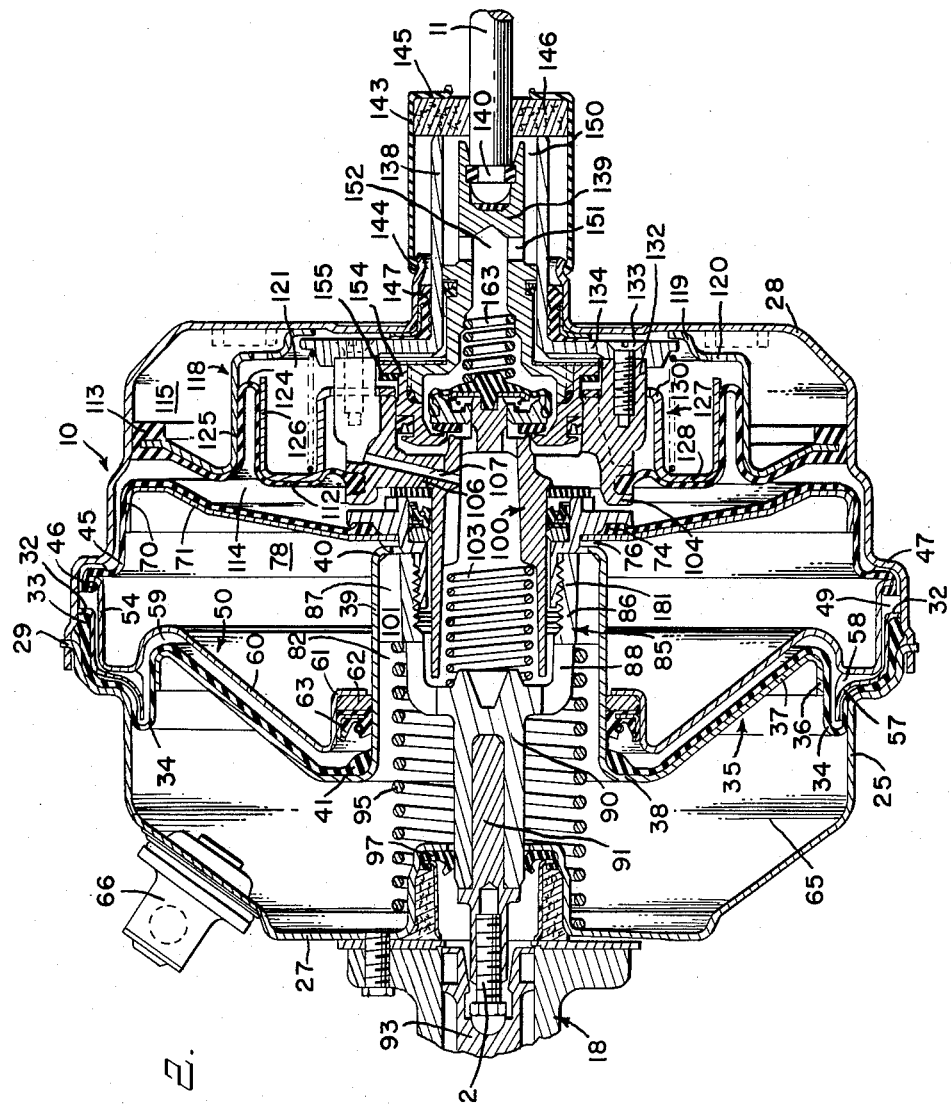

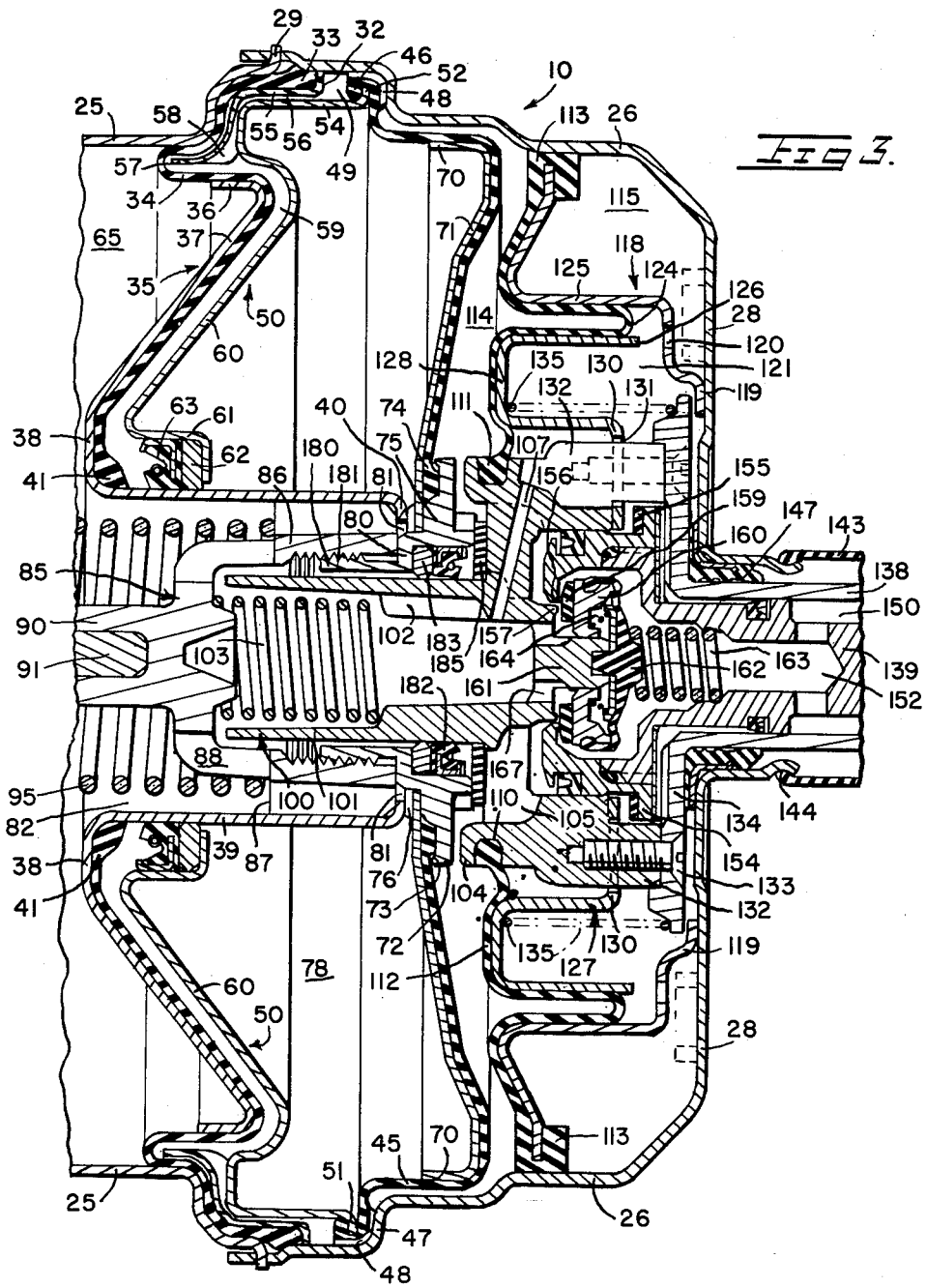

United States Patent Office 3,152,518
Patented Oct. 13, 1964

3,152,518
FLUID PRESSURE MOTOR MECHANISM
David T. Ayers, Jr., Birmingham, Mich., assignor to Kelsey-Hayes Company, Romulus, Mich., a corporation of Delaware
Filed Mar. 8, 1963, Ser. No. 263,856
16 Claims. (Cl. 91—391)

This invention relates to a fluid pressure motor mechanism, and more particularly to a fluid pressure motor for operating the hydraulic brakes of a motor vehicle.

It has been the practice for a number of years to provide fluid pressure-operated booster brake motors for operating the hydraulic brakes of a motor vehicle, wherein the brake pedal, when depressed, operates the valve mechanism of the motor and assists the latter in generating pressures in the master cylinder. More recently, it has been proposed to provide for the full power operation of the brakes by means of a fluid pressure motor in which the brake pedal merely operates the valving of the motor, the brake pedal thus partaking of very slight movement from a normal off position to a fully applied brake position. Such a mechanism makes it feasible to place the brake pedal in a normal position close to the toe board, and a number of mechanisms have been developed for raising the brake pedal to a higher position for the full pedal operation of the master cylinder in the event of a failure of pressure for the motor.

Brake mechanisms of the type just referred to ordinarily use a source of super-atmospheric pressure for operating the motors. The structure carrying certain of the valve parts in a mechanism of such character remains stationary during brake operation when pressure is present and is adapted to be moved by a brake pedal-operated push rod for applying the brakes upon a failure of pressure in the source, the pressure responsive unit or piston of the motor being pushed by the brake pedal to transmit movement to the master cylinder piston.

An important object of the present invention is to provide a novel motor mechanism wherein the motor is adapted to perform all of the work of operating the vehicle brakes, wherein vacuum is used as the source of differential pressure and the motor is provided with dual pressure responsive elements, thus materially increasing the power of the motor in proportion to its diameter.

A further object is to provide such a motor mechanism wherein an axial structure is connected to both pressure responsive elements to transmit force therefrom to the master cylinder piston, and wherein the axially movable structure is adapted for pedal operation in the event of a failure of differential pressure in the source.

A further object is to provide, in combination with such motor mechanism, a second normally stationary axially movable structure carrying parts of the motor-energizing valve mechanism, the other parts of which are operable for energizing the motor upon slight movement of the brake pedal, and wherein the second axially movable structure is pedal operable to transmit movement to the first axially movable structure for the pedal-operation of the master cylinder piston in the event of a failure of pressure in the source.

A further object is to provide a novel type of elements associated with the two pressure responsive elements of the motor to estabilsh the four pressure chambers necessary for subjecting the pressure responsive elements to operating pressures, two of these chambers being in fixed communication with a source of vacuum, and the other two being normally connected to the source of vacuum and adapted to be cracked to the atmosphere by the pedal-operated valve mechanism when the motor is to be energized.

A further object is to provide a motor mechanism of such type wherein the normally stationary valve-carrying structure is provided with pressure surfaces open to pressure in one of the chambers to which atmospheric pressure is admitted so that such pressure, during normal operation, tends to assist in holding the normally stationary structure in its proper position, the differential pressure thus established for holding the normally stationary structure in position failing when the pressure in the source fails, thus permitting the normally stationary structure to be more easily pedal-operated.

A further object is to form one wall of one of the variable pressure chambers by a diaphragm having sealed connection with the motor casing structure and a normally stationary unit and engaged by a plate backed up by a counter-reaction spring, such plate being engageable with the manually operable unit to transmit reaction thereto as pressure builds up in the variable pressure chambers during normal operation of the brakes.

A further object is to provide spring biasing means between the normally stationary structure referred to and the axially movable structure connected to the pressure responsive elements to assist in holding the normally stationary structure in proper position.

Other objects and advantages of the invention will become apparent during the course of the following description.

In the drawings I have shown one embodiment of the invention. In this showing

FIGURE 1 is a side elevation of the motor mechanism and associated elements diagrammatically showing the connections from the master cylinders to the wheel cylinders;

FIGURE 2 is an enlarged axial sectional view through the motor mechanism; and

FIGURE 3 is an enlarged fragmentary sectional view through the motor.

Referring to FIGURE 1, the numeral 10 designates the motor mechanism as a whole, described in detail below, and having a valve mechanism operable by a push rod 11 connected as at 12 to a depending brake pedal 13, pivotally supported at its upper end as at 14 and having the usual pedal pad 15. The motor operates a conventional master cylinder plunger, further referred to below, operable in a master cylinder indicated as a whole by the numeral 18 and having a conventional outlet for supplying hydraulic fluid under pressure to lines 19 leading to the front wheel brake cylinders 20, and to a line 21, leading to the rear wheel brake cylinders 22.

Referring to FIGURE 3, the numerals 25 and 26 designate a pair of stamped motor casing sections respectively provided at their remote ends with heads 27 and 28, the casing sections being peripherally joined at their open ends by a suitable connection 29 forming no part of the present invention.

A clamping ring 32 clamps with respect to the adjacent ends of the casing sections 25 and 26 a longitudinally elongated bead 33 of a diaphragm 34. The diaphragm 34 is associated to a rigid stamped plate 35 having a cylindrical outer flange 36, a conical portion 37, a portion 38 transverse to the axis of the motor, and an inner elongated cylindrical portion 39, the free extremity of which is turned inwardly as at 40 to form a flange for a purpose to be described. The diaphragm 34 passes over the flange 36, the conical plate portion 37 and transverse portion 38, and is provided at its inner periphery with a relatively heavy bead 41 frictionally held in position around the cylindrical plate portion 39.

A second diaphragm 45 is provided with an outer peripheral bead 46 seating against the outer portion of the casing section 26 and against a shoulder 47 formed thereon. The bead 46 is provided at its outer surface with one or more grooves 48 communicating at their left-hand ends with a space 49 between the beads 33 and 46 for a purpose to be described. A rigid plate 50 is provided with a peripheral flange 51 seating in an annular groove 52 in the bead 46. Adjacent the flange 51, the plate 50 has a cylindrical portion 54 spaced from the adjacent cylindrical portion 55 of the retainer 32 to form a passage 56 also communicating with the space 49. Forwardly of the cylindrical portion 55, the retainer 32 extends inwardly and forwardly as at 57, and such portion of the retainer is formed with rearwardly stamped shoulders 58 whereby the passage 56 is adapted to communicate with a chamber 59 formed between the diaphragm 34 and plate 50. The plate 50 is provided with a conical forwardly and inwardly extending annular portion 60, the inner portion of the plate terminating in a socket portion 61 in which is arranged a bearing element 62 and a seal 63 forming a leakproof joint with the cylindrical plate portion 39. The space to the left of the plate 35 forms a constant vacuum chamber 65 communicating through a suitable fitting 66 with a source of vacuum, such as the intake manifold of the motor vehicle engine.

The diaphragm 45 passes rearwardly over the cylindrical outer flange 70 of a plate 71. An axially movable flange 72 is provided with a groove 73 receiving a bead 74 formed on the inner periphery diaphragm 45. The plate 71 projects inwardly beyond the bead 74 and has its inner extremity seating against a shoulder 75 carried by the flange 72. The inner extremity of the plate 71 is provided with stamped radial lugs to form passages 76, the radially outer ends of which communicate with a constant vacuum chamber 78 formed between the plates 60 and 71.

The flange 73 carries an inner hub portion 80 from which the inner extremity of the flange 40 is spaced as at 81, whereby the passages 76 communicate with the space 82 within the cylindrical plate portion 39, the space 82 forming, in effect, a part of the constant vacuum chamber 65. The space 81 and passages 76 obviously fixedly connect the chambers 65 and 78 so that constant vacuum is maintained in these chambers.

An axial work-transmitting structure indicated as a whole by the numeral 85, is arranged in the motor and is provided with a rear cylindrical portion 86 from which project radial ribs 87 having a pressed fit in the cylindrical wall 39. Intermediate its ends, the structure 85 is ported as at 88 to communicate with the chamber 65.

The forward portion of the structure 85 is reduced and cylindrical in form as at 90 and the rear end of a stem 91 fits therein and carries at its forward end an adjustable force transmitting stem 92 engaging the conventional plunger 93 of the master cylinder to operate such plunger to displace fluid into the brake lines, as will be understood. A return spring 95 is arranged between the head 27 and the forward edges of the ribs 87 to bias rearwardly the force transmitting unit of the mechanism. When the motor is energized, the portion 90 of the unit 85 slides in a seal 97 carried by the casing section 25.

A normally stationary axial structure 100 is arranged in the motor and carries parts of the valve mechanism. The structure 100 includes a forward cylindrical portion 101 provided with internal axial ribs 102. A spring 103 seats at its rear end against the ribs 102 and at its forward end against the work transmitting unit 85 to tend to maintain the structure 100 in its normal rearward position shown in FIGURES 2 and 3.

The structure 100 includes an outer concentric structure 104 spaced from the inner portion of the structure 101 to provide a fluid passage 105, the outer structure being connected to the inner structure by webs 106, one of which is provided with an air passage 107 opening at its inner end to the space within the cylindrical portion 101. The concentric portion 104 is provided with an annular groove 110 in which fits the bead 111 of a diaphragm 112. This diaphragm is provided with an outer peripheral bead 113 fitting in the casing section 26. The diaphragm 112 forms with the diaphragm 45 a variable pressure chamber 114, and the diaphragm referred to forms with the right-hand end of the casing section 26 a constant vacuum chamber 115.

A stamped annular plate 118 has its outer periphery seating in the bead 113. The diaphragm 112 passes around a portion of the plate 118, the right-hand end 119 of which is welded or otherwise secured to the head 28. The plate 118 is provided with one or more openings 120 connecting the chamber 115 to a chamber 121 whereby the chambers 115 and 121 form, in effect, a single chamber.

Intermediate the inner and outer limits thereof, the diaphragm 112 is annularly looped as at 124 and the adjacent parallel portions thereof are adapted to roll respectively over concentric flanges 125 and 126 formed respectively on the plate 118 and another plate 127 having a portion 128 perpendicular to the axis of the motor and over which the diaphragm 112 extends. The plate 127 has a rear wall 130 perpendicular to the axis of the motor and seating against the back of the concentric portion 104 of the structure 100. The wall 130 is notched at circumferentially spaced points as at 131 for the projection therethrough of bosses 132 receiving screws 133 by means of which the structure 100 as a whole is fixed to a rear plate 134. A spring 135 is arranged between the plate 134 and the wall portion 128 as shown in FIGURE 3.

The plate 134 is provided with a rearwardly extending sleeve portion 138 within which is slidable a sleeve 139 having sealed engagement therewith. The rear end of the sleeve 139 is connected as at 140 to the push rod 11. Accordingly, when the brake pedal is depressed, the push rod 11 moves the sleeve 139 forwardly. The rear end of the sleeve 138 is surrounded by a rubber or similar sleeve 143 having connection as at 144 with the rear end of the casing section 128, and turns inwardly at its rear end as at 145 to enclose an air cleaner 146. A reinforced seal 147 is arranged between the plate 134 and sleeve 138 and the casing section 28 to seal the chamber 121 from the space within the sleeve 143.

Within the sleeve 138 is formed a chamber 150 open to the atmosphere through the air cleaner 146 and open also through a port 151 with a chamber 152 formed within the sleeve 139 and the associated elements to be described.

The forward end of the sleeve 139 carries a valve body 154 sealed with respect to the concentric body portion 104 for sliding engagement therein. The outer flange portion of the valve body 154 is provided with a rubber bumper 155. The forward end of the valve body 154 carries a valve seat 156 concentric with a surrounding second valve seat 157 from which it is annularly spaced. The valve seat 156 normally engages a resilient valve 159 carried by an annular thimble 160 slidable on the adjacent hub portion 161 of the structure 100 and sealed with respect thereto by a diaphragm 162 biased forwardly by a spring 163. The thimble 160 is biased forwardly by a spring 164. Therefore, when the valve seat 156 is moved forwardly upon operation of the brake pedal, the spring 164 causes the thimble 160 to move forwardly until the valve 159 engages the seat 157, after which the valve seat 156 moves away from the valve 159 to connect the chamber 152 to the chamber 114 and, through passages 48 and 56, with the chamber 59. Normally, these chambers are disconnected from the atmosphere and are open around the valve seat 157, through a port 167 with the space within the structure 100 and consequently with the chamber 65. Accordingly, there is always vacuum present inwardly of the valve seat 157.

The flange 72 is provided with an inner sleeve portion 180 having threaded connection as at 181 with the rear sleeve portion 86 of the unit 85. The flange 72 and sleeve 180 form a part of the force transmitting unit of the motor and have slidable sealed connection with the cylindrical portion 101 of the structure 100 by means of a pressed-in seal 182 forwardly of which is arranged a bearing ring 183. The pressure movable unit of the motor is biased rearwardly by the spring 95, as stated, and the rear of the flange 72 seats against a rubber washer 185 which, in turn, seats against the adjacent portions of the structure 100.

Operation

The parts normally occupy the positions shown in FIGURES 2 and 3, and it will become apparent that the structure 100, diaphragm 112 and plate 127 will remain stationary in their normal positions so long as vacuum is present in the source. When the brakes are to be applied, the pedal 13 is depressed to move the push rod 11 to the left in FIGURE 2. The valve seat 156 moves to the left, followed by the valve 159 until this valve engages the seat 157, at which time the valve elements will be in lap position. When the valve 159 engages the seat 157, the vacuum ports 167 will be closed, thus disconnecting the chambers 114 and 59 from the source of vacuum. Further movement of the pedal cracks the valve seat 156, thus admitting air from the chamber 152, around the valve seat 156 and through passage 105 into the chamber 114, which chamber communicates through passages 48, chamber 49 and passages 56 with the chamber 59.

As previously stated, the chamber 65 is always in communication with the source of vacuum through the fitting 66, and since the chamber 78 is in constant communication with the chamber 65 through space 81, vacuum will always be present in the chamber 78. The space within the structure 100 is always in communication with the source of vacuum through the openings 88, and the space within the structure 100 communicates through the passage 107 and openings 131 with the chamber 121. The latter chamber is in constant communication with the chamber 115 through the port 120. Accordingly, constant vacuum exists in the chambers 115 and 121.

When the valve mechanism operates in the manner described to admit air to the chambers 114 and 59, the diaphragms 34 and 45 will be moved by differential pressure. These two diaphragms impart movement through their associated plates 35 and 71 to the axially movable force transmitting unit 85, thus operating the master cylinder plunger 93 to displace fluid through lines 19 and 21 (FIGURE 1) to the respectively forward and rear wheel cylinders 20 and 22.

As previously stated, the unit comprising the structure 100, diaphragms 112, plate 127 and flange 134 all initially remain stationary. The tendency for this unit to remain stationary is strengthened by the increased pressure in the chamber 114 acting to the right while vacuum is maintained in the chambers 115 and 121. The plate 50 constitutes a rigid wall which remains stationary. The flange 51 is seated in the groove 52 and the left-hand outer end of the plate 50 seats against the ribs 58. The cross-sectional shape of the plate 50 is such that its degree of rigidity is sufficient to hold it against appreciable flexing by differential pressures in the chambers 59 and 78. Any slight tendency for such pressure to deform the inner peripheral portion of the plate 50 will result only in increasing the effective sealing of this plate relative to the cylindrical portion 39 of the plate 35.

Very little differential pressure is necessary in the initial operation of the motor since the brake shoes move relatively freely up to the point of engagement with the brake drums, the principal resistance, aside from negligible friction of the axially movable parts, being in the residual pressure valve (not shown) through which fluid is displaced from the master cylinder to the line 19. It is during this period that the diaphragm 112 remains stationary, the intermediate part of the diaphragm engaging the portion 128 of the plate 127 remaining in its normal position with the flange 130 engaging against the rear of the concentric portion 104 and being held in such position by the spring 135.

During such initial operation of the motor, increased pressure acting against the left-hand end of the valve body 154 while the right-hand end thereof is subject to vacuum in the chamber 121, somewhat resists pedal operation of the valve body 154, providing a first stage of pedal reaction. Approximately at the point of initial engagement of the brake shoes with the drums, resistance to movement of the force transmitting unit 85 causes a rapid increase in pressure in the chambers 114 and 59. When this pressure reaches a predetermined point, it acts against the diaphragm 112 to move the plate 127 against the loading of the counter-reaction spring 135 and the inner edge of the flange 130 comes into engagement with the rubber bumper 155 to resist pedal operation of the valve body 154, thus introducing a second stage of reaction which will be proportional to differential pressures in the chambers 114 and 121.

It will be apparent that the pedal need only be moved a fraction of an inch to energize the motor in the manner referred to, and the motor performs all of the work of applying the brakes without pedal assistance. The present mechanism is primarily intended to be used with a brake pedal arranged at the same height above the toe board of the vehicle as is true of the present pedals associated with booster brake mechanisms so that the pedal has sufficient travel to follow through for the pedal operation of the brakes, as further referred to below. The use of the two differential pressure responsive units comprising the diaphragms 34 and 45 provides adequate motor forces for applying the brakes without any pedal boosting and permits the motor to be made of relatively small diameter. A number of the parts of the mechanism are made of a simple stampings and most of the remaining parts are simple die castings, thus permitting the motor to be made economically.

It will be apparent that when the motor is de-energized, the springs 95 and 103 hold in normal position the structure 100 and associated parts. The spring 95 has a greater loading in its extended "off" position than the spring 103 in its compressed "off" position. When the unit operates normally, the extended portion of the spring 103 still provides some loading against the normally stationary structure to hold it in position. When motor energization takes place, the force tending to hold the parts referred to in normal positions is greatly increased by the higher pressure in the chamber 114 relative to pressures in the chambers 115 and 121.

If additional braking pressures are needed at power "run out," that is, after the point of maximum energization of the motor, some pedal forces can be added. This is particularly true where, due to leakage, full vacuum is not available in the source. Under such conditions, additional pedal forces, acting through the bumper 155, will move the flange 130 into engagement with the annular portion 104 of the structure 100, and the structure 100 can be moved to add forces to the force transmitting unit 85. This operation, of course, is feasible only if the pedal 13 is normally arranged sufficiently high to partake of the movement necessary for the structure 100 to follow through with respect to the master cylinder plunger 93.

In this connection, it is pointed out that the present mechanism may be used with a so-called "pop-up" pedal of which there are several known types in which the pedal will automatically move to a higher position and provide the leverage necessary for full pedal operation of the brakes in the event of a failure of power in the motor. The pedal mechanism forms no part of the present invention and may be of any desired type so that pedal assistance may be provided if the degree of vacuum decreases without completely failing, thus rendering pedal assistance feasible, if desired.

Assuming that a "pop-up" mechanism is employed and vacuum in the source should fail, the brake pedal will assume the higher position referred to and when it is operated to effect the movement of the valve parts, no differential pressures can be built up in the motor. Under such conditions, depression of the brake pedal will move the bumper 155 into engagement with the flange 130. The pressure movable units having failed to operate, the rear of the flange 72 will be in engagement with the washer 185, and accordingly, pedal movement may be transmitted to the force transmitting unit 85 to effect the pedal application of the brakes.

It will be noted that while two pressure responsive units comprising the diaphragms 34 and 45 are used, these units are connected to a common force transmitting unit so that pressures in the chambers 59 and 114 combine to move the master cylinder plunger and apply the brakes. If power should fail, the free rolling of the diaphragms 34, 45 and 112 offers no resistance to the pedal operation of the brakes, and accordingly, pedal forces can be applied without material frictional resistance to the master cylinder plunger to apply the brakes. The normally stationary parts include means (diaphragm 112, plate 127 and spring 135), for providing the brake pedal with "feel" reaction proportionate to the degree of energization of the motor.

In the claims, where such expressions as "if said valve mechanism fails to establish higher pressures in said variable pressure chambers" and "upon a failure of vacuum in said source" occur, it is understood that the operation so claimed is not limited to a complete failure to establish higher pressures in the variable pressure chambers or a complete failure of the vacuum in the source. The quoted expressions are intended to cover any failure beyond the point where the motor mechanism is ineffective for adequately applying the brakes without pedal assistance.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing, a plurality of pressure responsive elements and a plurality of walls forming with said pressure responsive elements and said casing a plurality of alternately constant and variable pressure chambers, an axial force transmitting unit connected to said pressure responsive elements, whereby the latter cooperate to effect movement of said force transmitting unit, a normally stationary axially movable structure co-axial with said force transmitting unit, a manually movable unit, a control valve mechanism for said motor mechanism comprising elements carried respectively by said normally stationary structure and by said manually movable unit and normally connected to all of said chambers to balance pressures therein, said manually movable unit being axially movable to operate said valve mechanism to connect said variable pressure chambers to a source of relatively high pressure to act on all of said pressure responsive elements whereby the latter cooperate to effect movement of said force transmitting unit, said force transmitting unit, said normally stationary structure and said manually movable unit being movable in engagement with each other to transmit movement from said manually movable unit to said force transmitting unit if said valve mechanism fails to establish higher pressures in said variable pressure chambers.

2. A fluid pressure motor mechanism comprising a casing, a plurality of pressure responsive elements and a plurality of walls forming with said pressure responsive elements and said casing a plurality of alternately constant and variable pressure chambers, an axial force transmitting unit connected to said pressure responsive elements, whereby the latter cooperate to effect movement of said force transmitting unit, a normally stationary axially movable structure co-axial with said force transmitting unit, a manually movable unit, a control valve mechanism for said motor mechanism comprising elements carried respectively by said normally stationary structure and by said manually movable unit and normally connected to all of said chambers to balance pressures therein, said manually movable unit being axially movable to operate said valve mechanism to connect said variable pressure chambers to a source of relatively high pressure to act on all of said pressure responsive elements whereby the latter cooperate to effect movement of said force transmitting unit, said force transmitting unit, said normally stationary structure being movable by said manually movable unit to transmit movement to said force transmitting unit if said valve mechanism fails to establish higher pressures in said variable pressure chambers, said normally stationary structure having pressure surfaces exposed to one of said variable pressure chambers whereby, when pressure is increased in said variable pressure chambers, the increased pressure in said one chamber will tend to maintain said normally stationary structure in a normal position.

3. A fluid pressure motor mechanism comprising a casing, a plurality of pressure responsive elements and a plurality of walls forming with said pressure responsive elements and said casing a plurality of alternately constant and variable pressure chambers, an axial force transmitting unit connected to said pressure responsive elements, whereby the latter cooperate to effect movement of said force transmitting unit, a normally stationary axially movable structure co-axial with said force transmitting unit, a manually movable unit, a control valve mechanism for said motor mechanism comprising elements carried respectively by said normally stationary structure and by said manually movable unit and normally connected to all of said chambers to balance pressures therein, said manually movable unit being axially movable to operate said valve mechanism to connect said variable pressure chambers to a source of relatively high pressure to act on all of said pressure responsive elements whereby the latter cooperate to effect movement of said force transmitting unit, said normally stationary structure having pressure surfaces exposed to one of said variable pressure chambers to be maintained in normal position by higher pressure therein, said manually movable unit being engageable with said normally stationary structure and the latter being engageable with said force transmitting unit whereby upon a failure of said valve mechanism to establish higher pressures in said variable pressure chambers, said manually movable unit will move said normally stationary structure to effect movement of said force transmitting unit.

4. A fluid pressure motor mechanism comprising a casing, a plurality of pressure responsive elements and a plurality of walls forming with said pressure responsive elements and said casing a plurality of alternate vacuum and variable pressure chambers, said vacuum chambers communicating with each other and one of such chambers having a fitting adapted for connection with a source of vacuum, an axial force transmitting unit connected to said pressure responsive elements, whereby the latter cooperate to move said force transmitting unit, a normally stationary axially movable structure co-axial with said force transmitting unit, a co-axial manually movable unit, a control valve mechanism for said motor mechanism comprising elements carried respectively by said normally stationary structure and by said manually operable unit and normally connecting said variable pressure chambers to said vacuum chambers to balance pressure in all of such chambers, said normally stationary unit being biased to a normal off position whereby movement of said manually movable unit will operate said valve mechanism to disconnect said variable pressure chambers from said vacuum chambers and connect them to the atmosphere without movement of said normally stationary unit, said force transmitting unit and said normally stationary unit having engaging surfaces, said manually movable unit having lost motion connection with said normally stationary unit within the limits of which said valve mechanism operates and whereby, upon a failure of vacuum in said source, said manually movable unit will engage said normally stationary unit and transmit direct forces to said force transmitting unit.

5. A mechanism according to claim 4 wherein said axially movable structure has a pressure member sealed with respect thereto and with respect to said casing and forming one wall of one of said variable pressure chambers, said pressure member and said casing forming a vacuum chamber whereby, when atmospheric pressure is admitted to said last-named variable pressure chamber, it will create a biasing force tending to hold said normally stationary structure in its normal position.

6. A motor mechanism according to claim 5 wherein said pressure member is a diaphragm, and pressure responsive reaction means connected between said diaphragm and said manually movable unit to oppose movement thereto to a degree proportional to pressure in said last-named variable pressure chamber.

7. A motor mechanism according to claim 5 wherein said pressure member is a diaphragm, an annular reaction member co-axial with and surrounding said normally stationary structure and having a surface engaging said diaphragm, and a spring biasing said reaction member to a normal position engaging said normally stationary structure, said reaction member having lost motion connection with said manually movable unit and being movable into engagement therewith when said spring yields to pressure in said last-named variable pressure chamber to react against said manually movable unit.

8. A fluid pressure motor mechanism comprising a casing, a plurality of pressure responsive elements and a plurality of walls forming with said pressure responsive elements and said casing a plurality of alternately constant and variable pressure chambers, an axial force transmitting unit sealed to the inner peripheries of said pressure responsive elements, a normally stationary axially movable structure co-axial with said force transmitting unit, a manually movable unit, a control valve mechanism for said motor comprising a valve seat element carried by each of said normally stationary structure and said manually movable unit and normally opening all of said chambers to each other to balance pressures therein, said manually movable unit being axially movable to operate said valve mechanism to connect said variable pressure chambers to a source of relatively high pressure to act on all of said pressure responsive elements whereby the latter cooperate to effect movement of said force transmitting unit, said force transmitting unit, said normally stationary structure and said manually movable unit being movable in engagement with each other to transmit movement from said manually movable unit to said force transmitting unit if said valve mechanism fails to establish higher pressures in said variable pressure chambers.

9. A fluid pressure motor mechanism comprising a casing, a plurality of pressure responsive elements and a plurality of walls forming with said pressure responsive elements and said casing a plurality of alternately constant and variable pressure chambers, an axial force transmitting unit sealed to the inner peripheries of said pressure responsive elements, a normally stationary axially movable structure co-axial with said force transmitting unit, a manually movable unit, a control valve mechanism for said motor mechanism comprising elements carried respectively by said normally stationary structure and by said manually movable unit and normally connected to all of said chambers to balance pressures therein, said manually movable unit being axially movable to operate said valve mechanism to connect said variable pressure chambers to a source of relatively high pressure to act on all of said pressure responsive elements whereby the latter cooperate to effect movement of said force transmitting unit, said normally stationary structure having pressure surfaces exposed to one of said variable pressure chambers whereby, when pressure is increased in said variable pressure chambers, the increased pressure in said one chamber will tend to maintain said normally stationary structure in a normal position.

10. A fluid pressure motor mechanism comprising a casing, a plurality of pressure responsive elements and a plurality of walls forming with said pressure responsive elements and said casing a plurality of alternately constant and variable pressure chambers, an axial force transmitting unit sealed to the inner peripheries of said pressure responsive elements, a normally stationary axially movable structure co-axial with said force transmitting unit, a manually movable unit, a control valve mechanism for said motor mechanism comprising elements carried respectively by said normally stationary structure and by said manually movable unit and normally connected to all of said chambers to balance pressures therein, said manually movable unit being axially movable to operate said valve mechanism to connect said variable pressure chambers to a source of relatively high pressure to act on all of said pressure responsive elements whereby the latter cooperate to effect movement of said force transmitting unit, said normally stationary structure having pressure surfaces exposed to one of said variable pressure chambers whereby, when pressure is increased in said variable pressure chambers, the increased pressure in said one chamber will tend to maintain said normally stationary structure in a normal position, and whereby upon a failure of said valve mechanism to establish higher pressures in said variable pressure chambers, said normally stationary structure will be relatively freely axially movable, said manually movable unit being engageable with said normally stationary structure and the latter being engageable with said force transmitting unit whereby, upon a failure of said valve mechanism to establish higher pressures in said variable pressure chambers, said manually movable unit will move said normally stationary structure to effect movement of said force transmitting unit.

11. A fluid pressure motor mechanism comprising a casing, a pair of spaced pressure responsive units each comprising a movable rigid plate and a diaphragm connecting said plate to said casing, one of said plates forming with one end of said casing a vacuum chamber adapted for fixed connection with a source of vacuum, said one plate having a cylindrical portion extending longitudinally away from said one end of said casing, a stationary wall sealed at its outer end with respect to said casing and having sealed sliding engagement at its inner end with said cylindrical portion, said stationary wall forming with said one plate a variable pressure chamber and forming with the other movable plate a constant vacuum chamber communicating with said first-named chamber, a force transmitting unit connected to said movable plates, a normally stationary axially movable structure between said other movable plate and the other end of said casing, a diaphragm connecting said normally stationary structure to said casing and forming with said other movable plate a variable pressure chamber communicating with said first-named variable pressure chamber, a manually operable unit, and a valve mechanism comprising elements carried by said normally stationary structure and by said axially movable unit, said valve mechanism normally balancing pressures in all of said chambers and being operable to connect said variable pressure chambers to the atmosphere, pressure in said second variable pressure chamber, when said valve mechanism is operated, maintaining said normally stationary structure in a normal position, said manually movable unit being engageable with said normally stationary structure and the latter being engageable with said force transmitting unit whereby, when no vacuum is available for said vacuum chambers, movement of said manually operable unit will move said normally stationary structure to effect movement of said force transmitting unit.

12. A mechanism according to claim 11 wherein said valve mechanism and said manually operable unit have surfaces exposed respectively to pressure in said second-named variable pressure chamber and to vacuum, when said valve mechanism is operated, to react against movement of said manually operable unit.

13. A mechanism according to claim 11 wherein said last-named diaphragm forms with said other end of said casing a third constant vacuum chamber, and means in said third vacuum chamber subject to pressure in said second-named variable pressure chamber acting against said last-named diaphragm for reacting against said manually operable unit to a degree proportional to pressure in said second-named variable pressure chamber.

14. A mechanism according to claim 11 wherein said valve mechanism and said manually operable unit have surfaces exposed respectively to pressure in said second-named variable pressure chamber and to vacuum, when said valve mechanism is operated, to react against movement of said manually operable unit, said last-named diaphragm forming with said other end of said casing a third vacuum chamber, a plate in such chamber engaging said last-named diaphragm and being movable to engage said manually operable unit, and a counter-reaction spring in said third vacuum chamber biasing said reaction plate to a normal position engaging said normally stationary structure, said spring yielding to increased pressures in said second-named variable pressure chamber to be moved into engagement with said manually operable unit to transmit reaction thereto when pressure in said second-named variable pressure chamber increases to a predetermined point.

15. A mechanism according to claim 11 wherein said normally stationary structure is provided with a cylindrical portion on which said force transmitting unit slides in sealed engagement, the interior of said cylindrical portion of said normally stationary structure being open to vacuum and to said valve mechanism, said manually operable unit being hollow and open to said valve mechanism, a push rod connected to said manually operable unit and projecting therefrom, and an air cleaner in which said push rod slides and having connection with said casing and through which the interior of said manually operable unit is open to the atmosphere.

16. A fluid pressure motor mechanism comprising a casing, a pressure-responsive unit therein forming therewith a constant pressure chamber and a variable pressure chamber, an axial force-transmitting unit connected to said pressure-responsive unit to be operated thereby, a normally stationary axially movable structure co-axial with said force-transmitting unit, a manually movable unit, a control valve mechanism comprising elements carried respectively by said normally stationary structure and by said manually movable unit and normally connecting said chambers to balance pressures therein, said manually movable unit being axially movable to operate said valve mechanism to connect said variable pressure chamber to a source of relatively high pressure to effect movement of said pressure-responsive unit, said normally stationary structure normally engaging said force-transmitting unit to move the latter upon movement of said manually operable unit if said valve mechanism fails to establish high pressure in said variable pressure chamber, a spring arranged between said casing and said pressure-responsive unit to bias it to normal position, and a loaded compression spring between said force-transmitting unit and said normally stationary unit, said springs combining to maintain said normally stationary unit in a normal position when pressures are balanced in said chambers, said loaded spring, when said force-transmitting unit is operated by said pressure responsive unit, retaining sufficient loading to tend to hold said normally stationary unit in its normal position.

References Cited in the file of this patent
UNITED STATES PATENTS

| | | |
|---|---|---|
| 2,989,035 | Stelzer | June 20, 1961 |
| 3,067,727 | Ayers et al. | Dec. 11, 1962 |
| 3,075,499 | Prather | Jan. 29, 1963 |
| 3,076,441 | Ayers | Feb. 5, 1963 |
| 3,078,677 | Cripe | Feb. 26, 1963 |
| 3,083,698 | Price et al. | Apr. 2, 1963 |